US012664150B2

(12) United States Patent
Driesen

(10) Patent No.: US 12,664,150 B2
(45) Date of Patent: Jun. 23, 2026

(54) MULTI-TENANCY USING SHARED DATABASES

(71) Applicant: SAP SE, Walldorf (DE)

(72) Inventor: Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 84 days.

(21) Appl. No.: 17/504,687

(22) Filed: Oct. 19, 2021

(65) Prior Publication Data

US 2023/0119834 A1      Apr. 20, 2023

(51) Int. Cl.
*G06F 16/23*      (2019.01)
*G06F 16/21*      (2019.01)
*G06F 16/27*      (2019.01)

(52) U.S. Cl.
CPC ........ *G06F 16/2379* (2019.01); *G06F 16/219* (2019.01); *G06F 16/27* (2019.01)

(58) Field of Classification Search
CPC ..... G06F 16/2379; G06F 16/27; G06F 16/219
USPC ......................................................... 707/636
See application file for complete search history.

(56) References Cited

U.S. PATENT DOCUMENTS 7,933,869 B2 *   4/2011  Becker .................. G06F 16/275
                                                            707/625
8,875,122 B2 *  10/2014  Driesen ..................... G06F 8/65
                                                            717/173
9,672,122 B1 *   6/2017  Gandhi ............... G06F 11/1438

10,452,646 B2   10/2019  Schlarb et al.
10,469,304 B1 *  11/2019  Kempe .................. H04L 41/12
10,482,080 B2   11/2019  Auer et al.
10,657,276 B2    5/2020  Birn et al.
10,713,277 B2    7/2020  Auer et al.
11,144,407 B1 * 10/2021  Shankar ............. G06F 11/1469
11,470,047 B1 * 10/2022  Shevade ............ H04L 12/4641
11,487,753 B1 * 11/2022  Singh .................. G06F 16/2379
11,604,705 B2 *  3/2023  Mehta ...................... G06F 3/065
11,741,050 B2 *  8/2023  Jujjuri ................ G06F 12/0868
                                                            707/736
2010/0211548 A1 *  8/2010  Ott .......................... G06F 16/27
                                                            707/655
2014/0114913 A1 *  4/2014  Engelko ................ G06F 16/119
                                                            707/E17.005
2014/0379921 A1 * 12/2014  Morley ............... G06F 11/2094
                                                            709/226

(Continued)

*Primary Examiner* — Md I Uddin
*Assistant Examiner* — Jessica N Le
(74) *Attorney, Agent, or Firm* — Fish & Richardson P.C.

(57) ABSTRACT

Implementations include providing a set of tenant databases within a cloud platform, each tenant database being executed as a database instance within a respective resource unit, providing a set of shared databases within the cloud platform, each shared database being executed as a database instance within a respective resource unit, at least one shared database being accessed by two or more tenant databases of the set of tenant databases, defining, within the set of tenant databases, one or more execution groups, each execution group including two or more tenant databases of the set of tenant databases, executing, for a first execution group, an update procedure to provide a first target version shared database, the first target version shared database being updated relative to one or more source version shared databases, and switching each tenant database in the first execution group to read from the first target version shared database.

17 Claims, 9 Drawing Sheets

(56) References Cited

U.S. PATENT DOCUMENTS

| | | | |
|---|---|---|---|
| 2017/0286518 A1* | 10/2017 | Horowitz | G06F 16/2365 |
| 2018/0260261 A1* | 9/2018 | Mohammed | G06F 11/008 |
| 2018/0314750 A1* | 11/2018 | Merriman | H04L 67/1097 |
| 2019/0012105 A1* | 1/2019 | Schreter | G06F 3/0611 |
| 2019/0018874 A1* | 1/2019 | Eberlein | G06F 16/211 |
| 2019/0130121 A1* | 5/2019 | Birn | G06F 16/211 |
| 2019/0272331 A1* | 9/2019 | Gangadhar | H04L 43/16 |
| 2019/0342229 A1* | 11/2019 | Khinvasara | H04L 45/04 |
| 2020/0257673 A1* | 8/2020 | Auer | G06F 16/215 |
| 2020/0322453 A1* | 10/2020 | Said | H04L 67/1097 |
| 2020/0379806 A1* | 12/2020 | Mann | G06F 9/4818 |
| 2021/0034605 A1* | 2/2021 | Cai | G06F 16/27 |
| 2021/0149915 A1* | 5/2021 | Lee | G06F 16/2282 |
| 2021/0182248 A1* | 6/2021 | Jayanthi | G06F 9/45558 |
| 2021/0191718 A1* | 6/2021 | Draude | G06F 8/77 |
| 2021/0216565 A1* | 7/2021 | Petschulat | G06F 16/254 |
| 2021/0226861 A1* | 7/2021 | Barsalou | G06F 9/5027 |
| 2021/0349795 A1* | 11/2021 | Sangala | G06F 11/3034 |
| 2022/0050674 A1* | 2/2022 | Liljeback | G06F 8/60 |
| 2022/0171778 A1* | 6/2022 | Desai | G06F 16/9035 |
| 2022/0245092 A1* | 8/2022 | Jujjuri | G06F 16/172 |
| 2022/0245094 A1* | 8/2022 | Jujjuri | G06F 16/164 |
| 2022/0276998 A1* | 9/2022 | Bian | G06F 16/23 |
| 2022/0350587 A1* | 11/2022 | Galgali | G06F 8/65 |
| 2023/0004414 A1* | 1/2023 | Lin | H04L 41/0895 |
| 2023/0065431 A1* | 3/2023 | Kumar | G06F 9/445 |
| 2023/0066988 A1* | 3/2023 | Suzuki | H10F 39/8053 |

* cited by examiner

Provide set of tenant databases ⟋ 402

Provide set of shared databases ⟋ 404

Define logical group(s) ⟋ 406

Define execution group(s) ⟋ 408

Execute update procedure ⟋ 410

Switch tenant databases to target version ⟋ 412

MULTI-TENANCY USING SHARED DATABASES

BACKGROUND

A multi-tenancy software architecture can include a single instance of a software application that runs on a server and serves multiple tenants. A tenant is a group of users or enterprises, who share a common access to the software instance. In a multi-tenant architecture, the software application can be designed to provide every tenant a dedicated share of the instance. This can include tenant-specific data, configuration, user management, and tenant-specific functionality. In some multi-tenancy architectures, multiple tenants share a database, referred to as a shared database. In some examples, shared content is stored within a shared database.

Traditional multi-tenant configurations, however, present challenges. For example, multiple tenants are deployed to a single cluster that also includes the shared database shared amongst the tenants of the cluster. In such a configuration, any issue that impacts a single tenant, impacts all tenants in the cluster. For example, if the shared database is to be updated (e.g., hot-fix, patch, upgrade) for one tenant, the shared database is updated for all tenants. That is, the procedure is executed for all tenants of the cluster. This is the case, even if all tenants might not desire the update and/or if the update could result in errors for one or more of the tenants.

Further, timing of such procedures can be different across tenants (e.g., an appropriate time for one tenant might not be an appropriate time for another tenant). In some instances, a tenant might require an update, such as an emergency patch, and must be removed from the cluster and re-deployed to another cluster before the update is executed. This comes at the expense of time and resources, as well as prolonged downtime for the tenant that is moved. Another issue is that a blast radius resulting of a change can affect other tenants. For example, in a cluster, a fail-over of one tenant can result in a fail-over of other tenants in the cluster, a maintenance downtime spill-over for one tenant can result in spill-over of other tenants in the cluster, and a failed upgrade and revoke to start-release for one tenant can result in other tenants being revoked to the start release.

SUMMARY

Implementations of the present disclosure are directed to providing shared databases in multi-tenancy database systems. More particularly, implementations of the present disclosure are directed to multi-tenancy database systems including a set of shared databases and a set of tenant databases, each database being provided as a database instance in a cloud platform. In some examples, two or more tenant databases access a shared database of the set of shared databases.

In some implementations, actions include providing a set of tenant databases within a cloud platform, each tenant database being executed as a database instance within a respective resource unit, providing a set of shared databases within the cloud platform, each shared database being executed as a database instance within a respective resource unit, at least one shared database being accessed by two or more tenant databases of the set of tenant databases, defining, within the set of tenant databases, one or more execution groups, each execution group including two or more tenant databases of the set of tenant databases, executing, for a first execution group, an update procedure to provide a first target version shared database, the first target version shared database being updated relative to one or more source version shared databases, and switching each tenant database in the first execution group to read from the first target version shared database. Other implementations of this aspect include corresponding systems, apparatus, and computer programs, configured to perform the actions of the methods, encoded on computer storage devices.

These and other implementations can each optionally include one or more of the following features: tenant databases in the set of tenant databases include different types of tenant databases; actions further include defining, within the set of tenant databases, one or more logical groups, tenant databases in a logical group reading from a same shared database, each logical group enabling reconfiguration in event of occurrence of a failover; tenant databases in one or more of the first execution group and a logical group include different types of tenant databases; prior to executing the update procedure, a first tenant database in the first execution group reads from a first version shared database and a second database in the second execution group reads from a second version shared database, the first version shared database being different than the second version shared database; actions further include executing, for a second execution group that is different from the first execution group, an update procedure to provide a second target version shared database, the second target version shared database being updated relative to a second source version database, and switching each tenant database in the second execution group to read from the second target version shared database; and the cloud platform is provisioned in Kubernetes and each resource unit includes a pod.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

3

Figure 2:
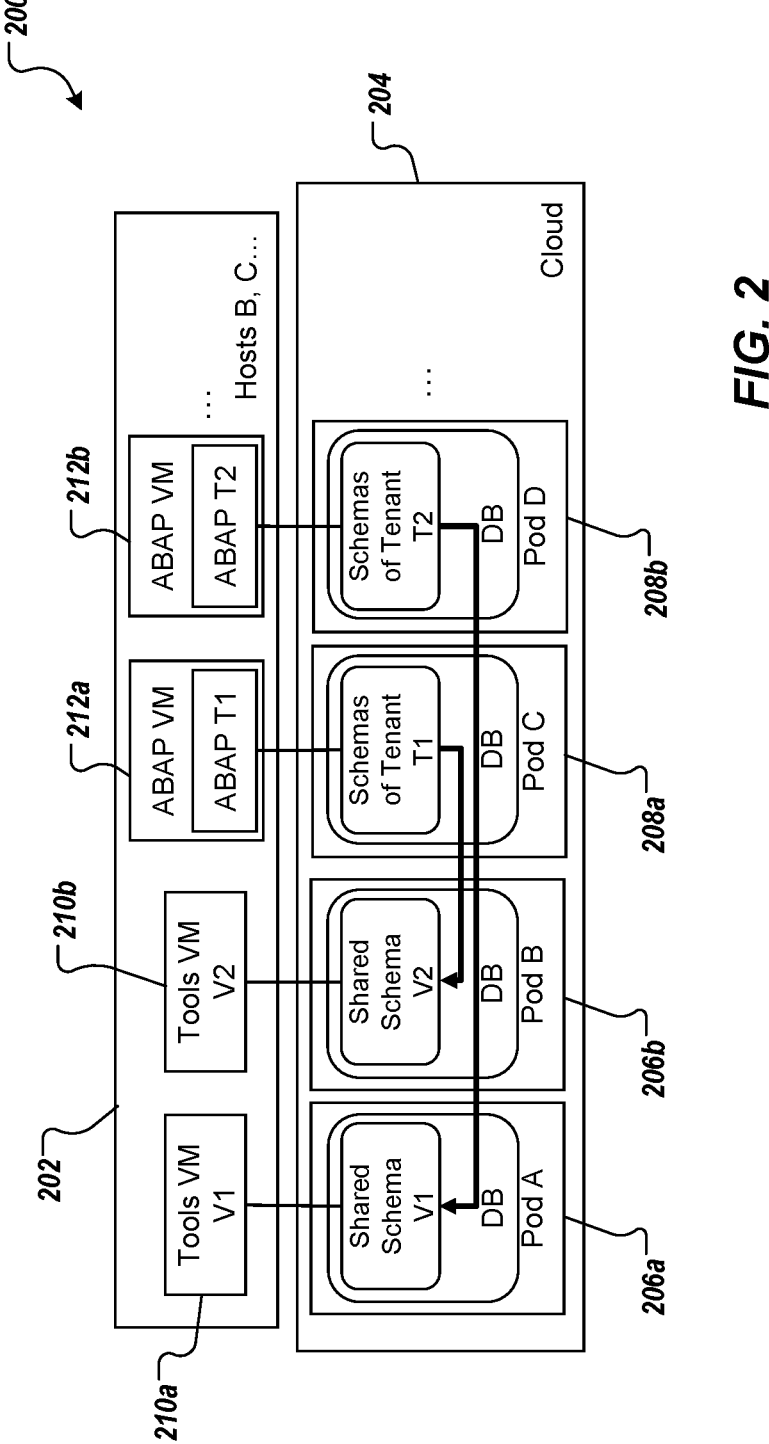

FIG. 2 depicts an example conceptual architecture in accordance with implementations of the present disclosure in accordance with implementations of the present disclosure.

FIGS. 3A-3E depict schematic representations illustrating characteristics of multi-tenancy in accordance with implementations of the present disclosure.

Figure 4:
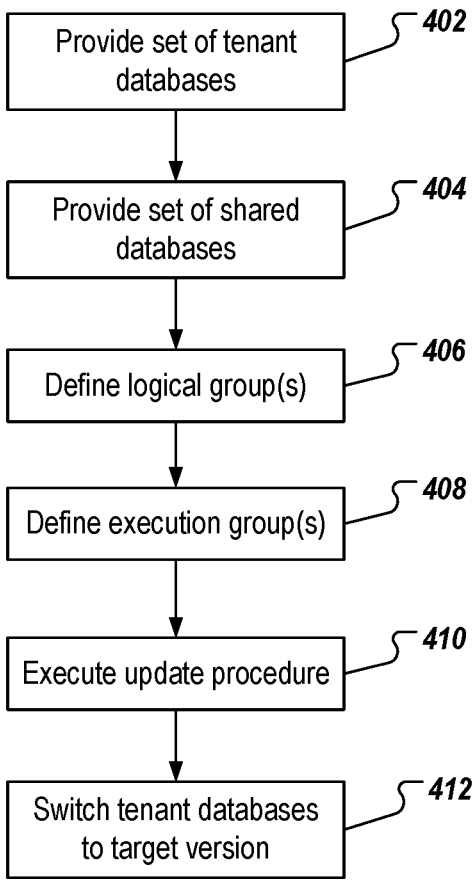

FIG. 4 depicts an example process that can be executed in accordance with implementations of the present disclosure.

Figure 5:
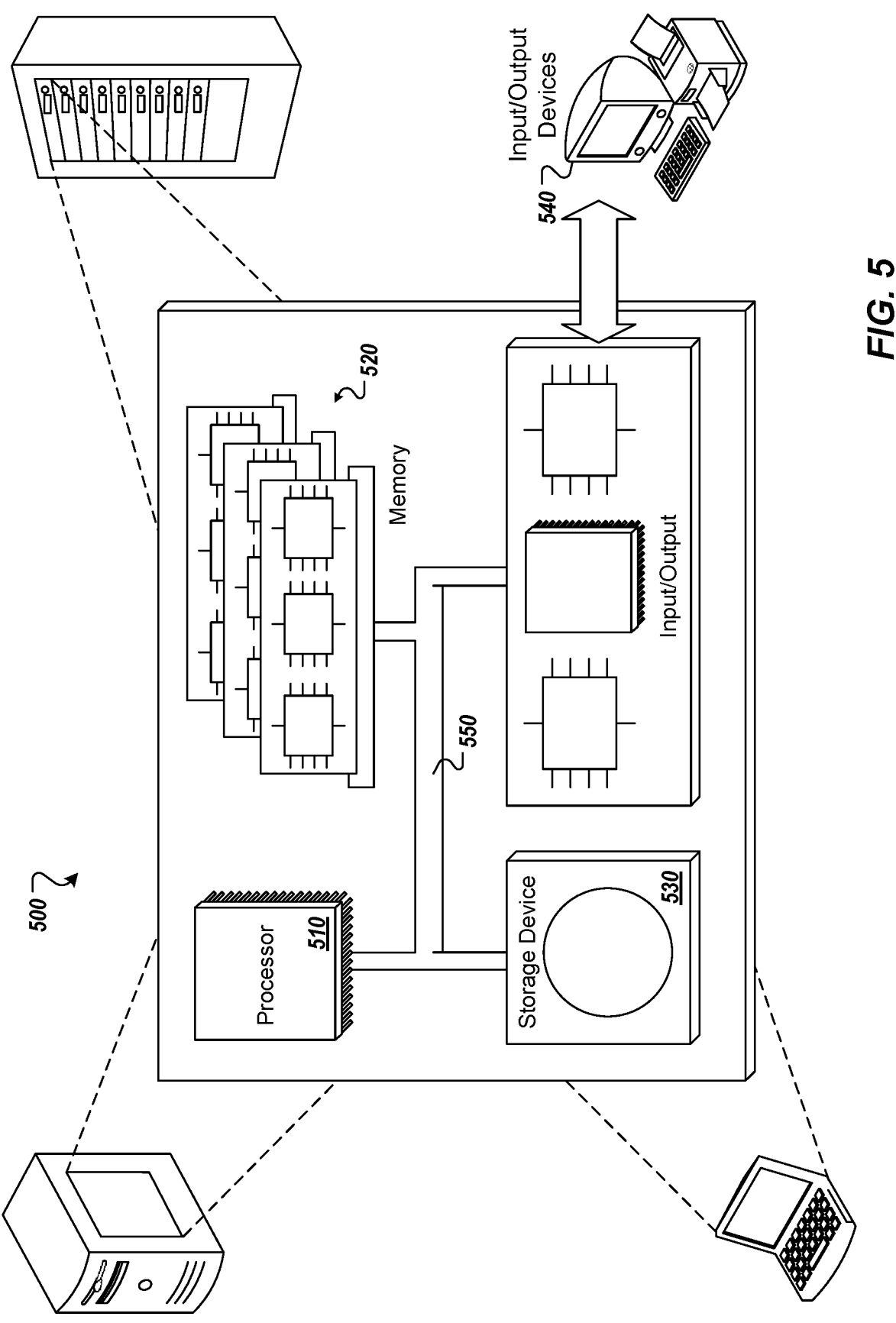

FIG. 5 is a schematic illustration of example computer systems that can be used to execute implementations of the present disclosure.

Like reference symbols in the various drawings indicate like elements.

DETAILED DESCRIPTION

Implementations of the present disclosure are directed to providing shared databases in multi-tenancy database systems. More particularly, implementations of the present disclosure are directed to multi-tenancy database systems including a set of shared databases and a set of tenant databases, each database being provided as a database instance in a cloud platform. In some examples, two or more tenant databases access a shared database of the set of shared databases.

In some implementations, actions include providing a set of tenant databases within a cloud platform, each tenant database being executed as a database instance within a respective resource unit, providing a set of shared databases within the cloud platform, each shared database being executed as a database instance within a respective resource unit, at least one shared database being accessed by two or more tenant databases of the set of tenant databases, defining, within the set of tenant databases, one or more execution groups, each execution group including two or more tenant databases of the set of tenant databases, executing, for a first execution group, an update procedure to provide a first target version shared database, the first target version shared database being updated relative to one or more source version shared databases, and switching each tenant database in the first execution group to read from the first target version shared database.

To provide further context for implementations of the present disclosure, a multi-tenancy software architecture can include a single instance of a software application that runs on a server and serves multiple tenants. A tenant is a group of users or enterprises, who share a common access to the software instance. In a multi-tenant architecture, the software application can be designed to provide every tenant a dedicated share of the instance. This can include tenant-specific data, configuration, user management, and tenant-specific functionality.

Multi-tenancy can be used in cloud computing. For example, in some cloud-based multi-tenancy architectures, multiple tenants share a database, referred to as a shared database. In some examples, shared content is stored within a shared database. The shared content can include, but is not limited to, repository data, default configuration(s), documentation, common runtime artifacts, user interface (UI) definitions, and the like.

By providing a shared database, the database sizes of the tenants is reduced and the costs per tenant are reduced. This approach is designed for an operations model on "as-a-service" (e.g., infrastructure-as-a-service (IaaS), database-as-a-service (DaaS)), which enables hosting of a set of tenants and minimizing costs. In this approach, the shared database is provisioned within a shared container and each tenant has read-only access to the shared content. Each tenant is assigned a tenant-specific container within the database that stores tenant-specific data. Each tenant is only able to access (e.g., read, write access) their container and is inhibited from accessing containers of other tenants. Accordingly, while all tenant containers are provisioned within the database, tenants can only access their container within the database.

Traditional multi-tenant configurations, however, present challenges. For example, multiple tenants are deployed to a single cluster that also includes the shared database shared amongst the tenants of the cluster. In such a configuration, any issue that impacts a single tenant, impacts all tenants in the cluster. For example, if the shared database is to be updated (e.g., hot-fix, patch, upgrade) for one tenant, the shared database is updated for all tenants. That is, the procedure is executed for all tenants of the cluster. This is the case, even if all tenants might not desire the update and/or if the update could result in errors for one of the tenants.

Further, timing of such procedures can be different across tenants (e.g., an appropriate time for one tenant might not be an appropriate time for another tenant). In some instances, a tenant might require an update, such as an emergency patch, and must be removed from the cluster and re-deployed to another cluster before the update is executed. This comes at the expense of time and resources, as well as prolonged downtime for the tenant that is moved. Another issue is that a blast radius resulting of a change can affect other tenants. For example, in a cluster, a fail-over of one tenant can result in a fail-over of other tenants in the cluster, a maintenance downtime spill-over for one tenant can result in spill-over of other tenants in the cluster, and a failed upgrade and revoke to start-release for one tenant can result in other tenants being revoked to the start release.

In view of the foregoing, implementations of the present disclosure provide a multi-tenancy approach to database systems, in which cloud database instances are provisioned, a cloud database instance per tenant. In some examples, a set of tenant databases is provided, each tenant database being a separate database instance, and a set of shared databases is provided, each shared database being a separate database instance. In some examples, tenant databases are associated with an execution group, wherein any procedure (e.g., hot-fix, patch, upgrade) is executed on all tenant databases in the execution group regardless of which shared database (s) the tenants read from. In some examples, tenant databases are associated with a logical group, each tenant database within a logical group reading from the same shared database (e.g., a database of a particular version).

Implementations of the present disclosure are described in further detail herein with reference to an example cloud-based platform and example database system. The example cloud-based platform includes SAP HANA Cloud, provided by SAP SE. SAP HANA Cloud is provided as a database-as-a-service (DaaS) system and can be described as a cloud-native platform that provides full capabilities to manage data storage, virtualization, and run powerful applications. SAP HANA Cloud supports multi-tenancy. It is contemplated, however, that implementations of the present disclosure can be realized with any appropriate database system and/or cloud-based platform.

Figure 1:
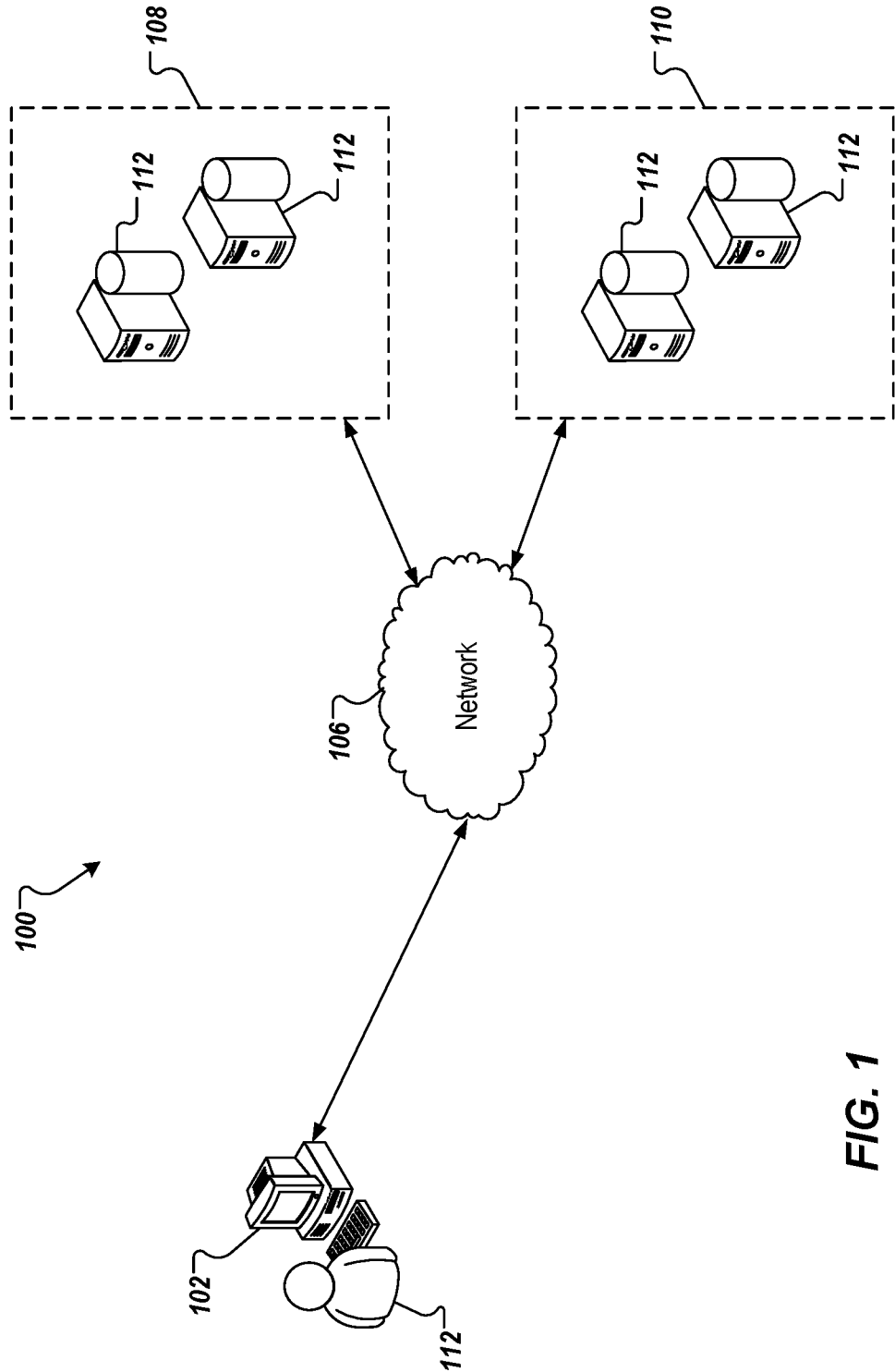
FIG. 1 depicts an example architecture in accordance with implementations of the present disclosure.

FIG. 1 depicts an example architecture 100 in accordance with implementations of the present disclosure. In the depicted example, the example architecture 100 includes a client device 102, a network 106, server systems 108, 110. Each of the server systems 108, 110 includes one or more server devices 112. In the depicted example, a user 112 interacts with the client device 102. In an example context, the user 112 can include a user, who interacts with an application that interacts with a database system hosted by the server system 108.

In some examples, the client device 102 can communicate with one or both of the server systems 108, 110 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 112 includes at least one server and at least one data store. In the example of FIG. 1, the server devices 112 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server systems store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications). In some examples, an application interacts with a database system. For example, the application can read data from and/or write data to the database system. That is, an application can submit a query to the database system and receive a query result from the database system.

In accordance with implementations of the present disclosure, a database system (e.g., SAP HANA Cloud) can be provisioned within the server system 110 and can support multiple tenants. That is, for example, each tenant of a set of tenants is able to interact with an instance of a software application (e.g., ERP, CRM, SCM, PLM) to access data within the database system. In some examples, each tenant is able to access tenant-specific data (e.g., read, write access) and is able to access shared data (e.g., read-only access).

As introduced above, implementations of the present disclosure provide a multi-tenancy approach to database systems, in which cloud database instances are provisioned, a cloud database instance per tenant. This obviates the use of clusters of tenants using one shared database (and being deployed to one database cluster) and synchronously handling all tenants in a cluster. Instead, and as described in further detail herein, implementations of the present disclosure provide a set of shared databases per availability zone, provide tenant-specific database instances, connect tenants to the shared database with the appropriate version, and run tenant-specific procedures. To handle large sets of tenants within one run, tenants can be logically grouped for execution to execution groups. The execution groups can handle all tenants or less than all tenants that read from a shared database. Implementations of the present disclosure also address modifications to existing procedures to enable the procedures to be executed within the multi-tenancy approach described herein.

FIG. 2 depicts an example conceptual architecture 200 in accordance with implementations of the present disclosure in accordance with implementations of the present disclosure. In the example of FIG. 2, the conceptual architecture 200 includes a host 202 and a cloud platform 204. In some examples, the cloud platform 204 is provided using a container orchestration system. An example container orchestration system is the Kubernetes platform, maintained by the Cloud Native Computing Foundation, which can be described as an open-source container orchestration system for automating computer application deployment, scaling, and management. Kubernetes manages containers with pods, which are the smallest deployable objects in Kubernetes. Each pod is provided as one or more containers with shared storage/network resources, and a specification for how to run the containers. In some examples, a pod can be referred to as a resource unit that includes an application container. Applications can be defined as Kubernetes deployments, which are backed by a number of identical pods running application containers. Within Kubernetes, each cluster can run across multiple availability zones, the availability zones being in logical groupings called region. In some examples, a region includes a set of availability zones that provide a consistent set of features (e.g., within a region, each availability zone offers the same APIs and services).

In the example of FIG. 2, the cloud platform 204 hosts shared databases 206a, 206b and tenant databases 208a, 208b. In the example of FIG. 2, each of the shared databases 206a, 206b and the tenant databases 208a, 208b is provisioned within a resource unit, such as a pod in scenarios using Kubernetes. In the example of FIG. 2, the host 202 hosts tools 210a, 210b and application instances 212a, 212b. In some examples, the tools 210a, 210b are able to access the shared databases 206a, 206b, respectively (e.g., to modify shared data stored within the respective databases).

In the example of FIG. 2, the application instance 212a is provisioned for a first tenant (T1) and is able to access the tenant database 208a, and the application instance 212b is provisioned for a second tenant (T2) and is able to access the tenant database 208b. For example, the application can include an ERP system that each of the first tenant and the second tenant uses in support of their respective enterprise operations. The application instance 212a enables the first tenant to execute functionality on tenant-specific data stored in the tenant database 208a and shared data stored in the shared database 206b. The application instance 212b enables the second tenant to execute functionality on tenant-specific data stored in the tenant database 208b and shared data stored in the shared database 206a. For example, respective schemas of the tenant databases 208a, 208b are able to (read-only) access shared data of the shared databases 206b, 206a through respective schemas.

As described herein, the multi-tenancy approach of the present disclosure provides a set of tenant databases, each tenant database being a separate database instance, and a set of shared databases, each shared database being a separate database instance. For example, and with reference to FIG. 2, a set of tenant databases includes the tenant databases 208a, 208b, and the set of shared databases includes the shared databases 206a, 206b. Each database is a separate database instance meaning that each database is provided in a respective resource unit. In Kubernetes terms, each database is provided in a respective pod. That is, each database is provided in a respective container provided by a respective pod.

Implementations of the present disclosure use availability zones and mirroring of databases to provide high availability of databases, both tenant databases and shared databases. More particularly, and as described in further detail herein, tenants that are deployed to one availability zone are linked to a shared database of the appropriate version (e.g., V1) within that availability zone. In this manner, latency that impacts performance (e.g., slow response times that violate service level agreements (SLAs)) is avoided, which would result from a tenant accessed in an availability zone accessing a shared database in another availability zone. Further, implementations of the present disclosure provide for tenant databases to be mirrored in an availability zone different than that of an active (original) tenant database. In this manner, if a tenant database fails in one availability zone, operations can switch to the mirror of the tenant database in another availability zone to provide high availability of the tenant database. Implementations of the present disclosure also avoid cross-zone access to a shared database after a switch-over of tenant databases, by making the shared database available in both availability zones.

FIGS. 3A-3E depict schematic representations illustrating characteristics of multi-tenancy in accordance with implementations of the present disclosure.

Figure 3A:
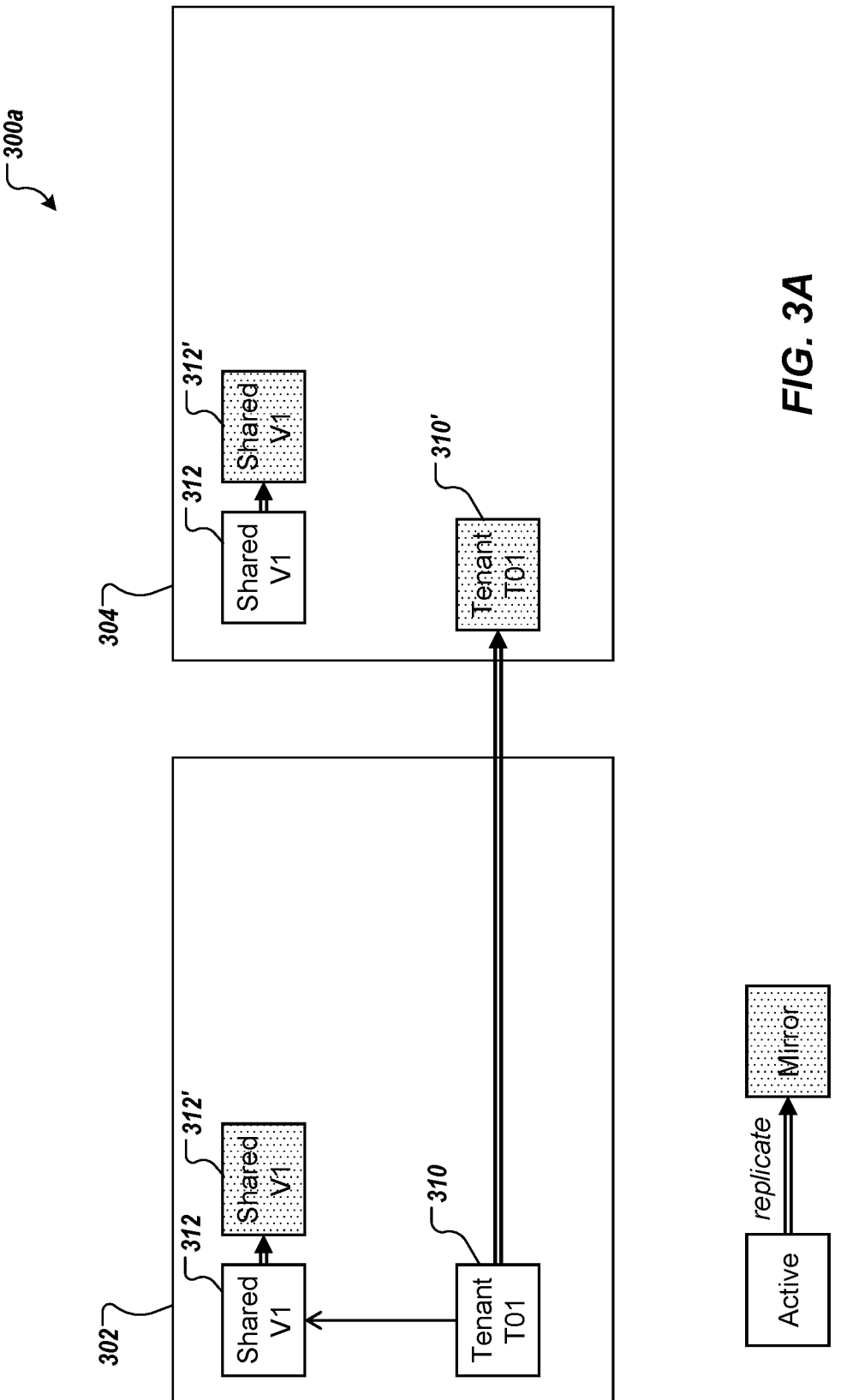

FIG. 3A depicts a schematic representation 300a that includes a first availability zone 302 and a second availability zone 304. The first availability zone 302 includes a first tenant database 310 and a first shared database 312. In some examples, a shared database is not modified after deployment. Instead, the shared database is created with a certain version and remains on that version. In the example of FIG. 3A, the first shared database 312 is of a first version (V1). The first availability zone 302 also include a first shared database 312', which is a mirror (copy) of the first shared database 312. The second availability zone 304 includes a first tenant database 310', which is a mirror of the first tenant database 310 (e.g., in case of failure of the first tenant database 310). The second availability zone 304 also includes copies of the first shared database 312 and the first shared database 312'.

The schematic representation 300a represents the characteristic that the first tenant database 310 and the first shared database 312 are provided in the same availability zone as each other, in this case, the first availability zone 302. In other words, a shared database required by a tenant in one availability zone is to be available to the tenant in that availability zone. The schematic representation 300a also represents the characteristic that a copy of the first shared database 312, that is, the first shared database 312', is to be provided in the same availability zone. In this manner, a high-availability mirror of a shared database is available in the same availability zone in case of failure.

Figure 3B:
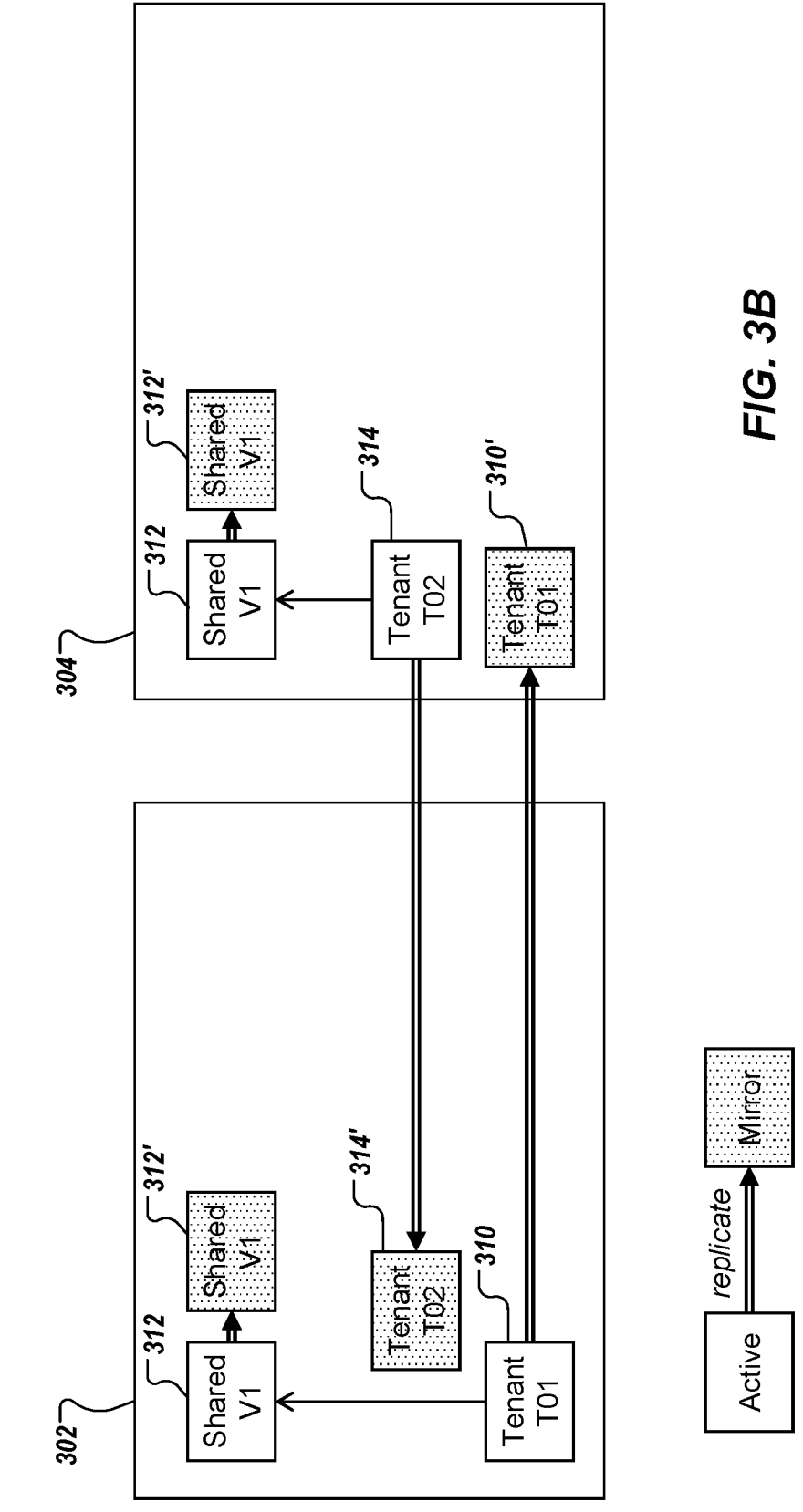

FIG. 3B depicts a schematic representation 300b representing an example failover. In the example of FIG. 3B, a second tenant database 314 is provided in the second availability zone 304. In the example of FIG. 3B, the second tenant 314 has previously been a copy of a second tenant database that was active in the first availability zone 302, but that had failed. Consequently, the second tenant database 314 became active and accesses the first shared database 312 in the second availability zone 314. In this manner, high availability of the second tenant database 314 is provided and with relatively fast access to the first shared database 312, because they are in the same availability zone. In the example of FIG. 3B, a second tenant database 314' is provided in the first availability zone 302 to provide high availability in case the second tenant database 314 fails within the second availability zone 304.

Figure 3C:
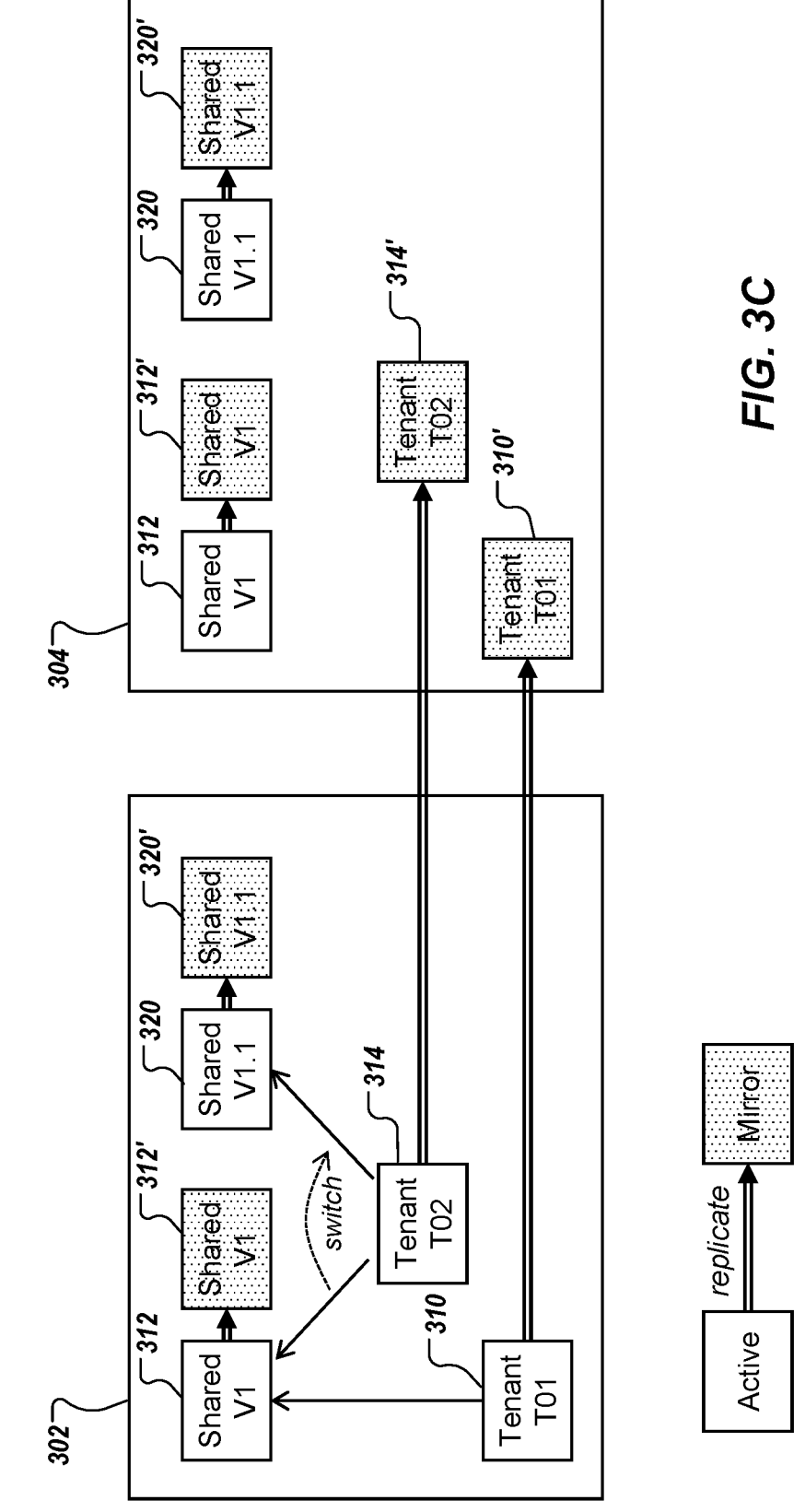

FIG. 3C depicts a schematic representation 300c representing an example update to the shared database 312. For example, an update can include a patch (e.g., code patch to address one or more bugs) that can be required for a tenant. In the example of FIG. 3C, a second shared database 320 is provided as an update for the first tenant database 314. Consequently, a second shared database 320 and a second shared database 320' (copy of the first shared database 320) are each provided as patched versions (e.g., V1.1) in the first availability zone 302. The second shared database 320 and the second shared database 320' are also provided in the second availability zone 304 (e.g., in case of eventual failure of the second tenant database 314). The second tenant database 314 switches to the second shared database 320. The schematic representation 300c of FIG. 3C represents the characteristic that, for each update, a new instance of a shared database is created. In this manner, not all tenants are impacted by an update to a shared database (e.g., in FIG. 3C, the first tenant database 310 continues to access the first shared database 312).

Figure 3D:
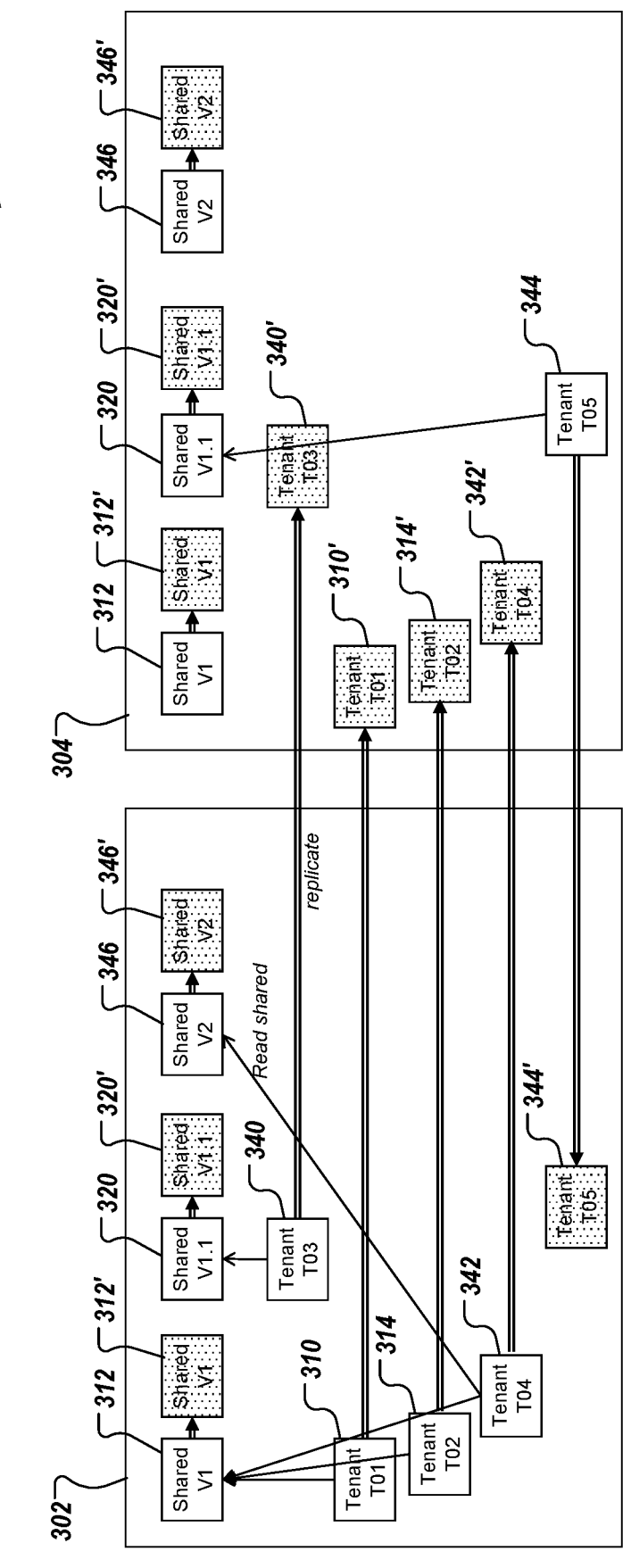

FIG. 3D depicts a schematic representation 300d representing an example upgrade to the shared database 312. For example, an upgrade can include an upgrade from a first version (V1) to a second version (V2) (e.g., to provide additional and/or modified functionality) that can be required for a tenant. In the example of FIG. 3D, the first shared database 312 is upgraded for a fourth tenant database 342. Consequently, a third shared database 346 and a third shared database 346' (copy of the third shared database 346) are each provided as updated versions (e.g., V2) in the first availability zone 302. The third shared database 346 and the third shared database 346' are also provided in the second availability zone 304 (e.g., in case of eventual failure of the fourth tenant database 342). The fourth tenant database 342 switches to the third shared database 346. In the example of FIG. 3D, a third tenant database 340 access the second shared database 320 and, respectively, includes a third tenant database 340' in the second availability zone 304. A fifth tenant database 344 is active in the second availability zone 204 and, respectively, includes a fifth tenant database 344' in the first availability zone 302.

The schematic representation 300*d* of FIG. 3D represents the characteristic that, for each upgrade, a new instance of a shared database is created. In this manner, not all tenants are impacted by an update to a shared database (e.g., in FIG. 3C, the first tenant database 310 and the second tenant database 314 continue to access the first shared database 312).

Figure 3E:
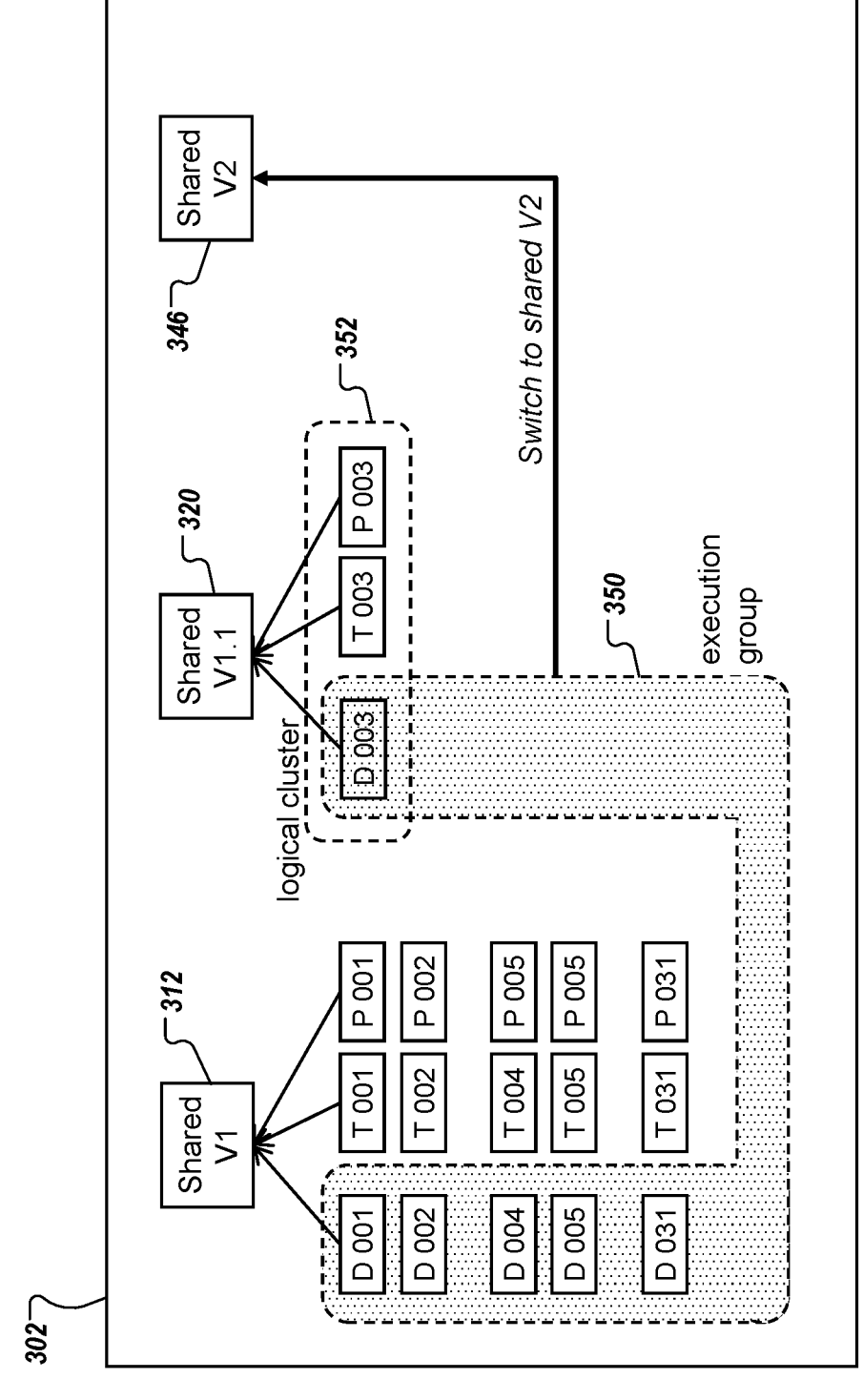

FIG. 3E depicts a schematic representation 300*e* representing use of execution groups 350 and logical clusters 352. The multi-tenancy approach of the present disclosure enables tenant-individual handling, but also provides for grouping of tenants to execution groups for collective operation. This is achieved without imposing technical constraints on the execution groups. By using execution groups, such as the execution group 350 of FIG. 3E, tenants can be selected in one availability zone for a certain operation (e.g., upgrade, patch deployment) independently of the shared database instance that the tenants are reading from. In this manner, implementations of the present disclosure avoid having to handle all tenants, which read from the same shared database, synchronously.

In further detail, a logical cluster, such as the logical cluster 352 of FIG. 3E, can be described as a group of tenants that are linked to one shared database instance. Such a logical cluster is the target for an operation on the shared database, such as a fail-over. In some examples, a tenant can be in multiple logical clusters, if multiple shared databases are configured and tenants read from the multiple shared databases. This can occur, for example, during an upgrade. In some examples, an execution group, such as the execution group 350 of FIG. 3E, can be described as the target for a lifecycle operation, such as a patch, to support mass execution of such operations (e.g., a patch issued for multiple tenants). In some examples, an execution group can contain tenants of different logical clusters and/or can contain less tenants than a logical cluster. After tenants in an execution group have been switched to the target (e.g., patched) shared database instances, the tenants are removed from the logical cluster of the source (e.g., pre-patch) shared database instance. In the example of FIG. 3E, tenants of the execution group 350 are being upgraded to the third shared database 346 (V2) from the first shared database 312 (V1) and the second shared database 320 (V1.1).

Implementations of the present disclosure also enable handling of different types of tenants. For example, there can be numerous different types of tenants each with individual handling requirements (e.g., different upgrade schedules, different operations procedures). Example types of tenants can include, without limitation, development tenant, testing tenant, production tenant, training tenant, among numerous others. With traditional approaches, the different types of tenants are deployed to different clusters, where a cluster only contains tenants of the same type (e.g., only production, only development). That is, in traditional approaches, types of tenants cannot be mixed within a clusters. Clusters share the same upgrade, hot-fix cycle, and patches, which are each deployed to complete clusters (i.e., all tenants in a cluster).

Implementations of the present disclosure obviate single-type clusters using logical clusters introduced above. In a logical cluster, all tenants that read from the same shared database can be included (i.e., tenants reading from the same version). For example, in the example of FIG. 3E, the logical cluster 352 includes a development tenant (D 003), a test tenant (T 003), and a production tenant (P 003), each of which reads from the second shared database 320. In some examples, a logical cluster is only used to execute a fail-over of the shared database instance. For change operations of the tenants, the logical cluster is not needed.

To enable mass operations on tenants, an execution group, such as the execution group 350 of FIG. 3E, of tenants can be configured. If an operation (e.g., hot fix deployment) is required for a certain type of tenant, the desired tenants (e.g., all tenants of a particular type) are selected and grouped for execution of the procedure. In the example of FIG. 3E, all development tenants are grouped in the execution group 350 for upgrade from V1 to V2. Accordingly, the execution group corresponds to a certain type of operation (e.g., hot-fix, patch, updgrade) and a certain type of tenant (e.g., development, test, production).

FIG. 4 depicts an example process 400 that can be executed in accordance with implementations of the present disclosure. In some examples, the example process 400 is provided using one or more computer-executable programs executed by one or more computing devices.

A set of tenant databases is provided (402) and a set of shared databases is provided (404). For example, and as described in detail herein, each tenant database in the set of tenant databases is provided as a separate database instance, and each shared database in the set of shared databases is provided as a separate database instance. Each database instance is provisioned within a resource unit (e.g., pod) of a container orchestration system (e.g., Kubernetes). One or more logical groups are derived (406). For example, and as described herein, for a logical group, each tenant database within the logical group reads from the same shared database (e.g., a database of a particular version). In some examples, a logical group is derived based on configuration information of tenant databases in the set of tenant databases. Tenant databases that read from the same version of a shared database (e.g., the shared database V1.1 320 of FIG. 3E), as indicated by their respective configuration information, are included in a logical group (e.g., the logical group 352 of FIG. 3E). In further detail, the logical groups are derived from the setup of the tenant databases, when the link to the shard database is defined. All tenant databases that have the same shared database defined in their configuration information are within one logical group. In some examples, logical groups are the target of failover operations for a shared database, when all tenant databases in the logical group may have to be re-configured to read from a new shared database. That is, for example, if a shared database of a logical group fails, a new shared database is provisioned, and tenant databases of the logical group are connected to the new shared database.

One or more execution groups are defined (408). For example, and as described herein, an execution group (e.g., the execution group 350 of FIG. 3E) of tenants can be configured. If an operation (e.g., hot fix deployment) is required for a certain type of tenant, the desired tenants (e.g., all tenants of a particular type) are selected and grouped for execution of the procedure within an execution group. Accordingly, the execution group corresponds to a certain type of operation (e.g., hot-fix, patch, updgrade) and a certain type of tenant (e.g., development, test, production). In some examples, an execution group can contain tenants of different logical groups and/or can contain less tenants than a logical cluster.

An update procedure is executed (410). For example, an update procedure (e.g., hot-fix, patch, upgrade) can be executed for a shared database to update the shared database from a source version (e.g., V1) to a target version (e.g., V1.1, V2). The update procedure is updated for all tenant databases of an execution group that is associated with the shared database. That is, after the update procedure, one or more tenant databases are switched to the target version (412). That is, the tenant databases in the execution group are switched to the target version of the shared database. After tenants in an execution group have been switched to the target (e.g., patched) shared database instances, the tenants are removed from the logical cluster of the source (e.g., pre-patch) shared database instance.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing shared databases in multi-tenancy database systems, the method comprising:

providing a set of tenant databases within a cloud platform, the set of tenant databases comprising a first tenant database and a second tenant database in a first availability zone;

providing a set of shared databases within the cloud platform, the set of shared databases comprising a first shared database in the first availability zone, the first shared database being a source version and being accessed by the first tenant database and the second tenant database in the first availability zone;

defining, within the set of tenant databases, one or more execution groups, a first execution group comprising the first tenant database and a second execution group comprising the second tenant database, the first tenant database and the second tenant database both being assigned to a first logical cluster;

executing, for the first execution group, an update procedure to provide a second shared database in a target version that is updated relative to the source version;

switching the first tenant database in the first execution group to read from the second shared database, and after the update procedure, the second tenant database still accessing the first shared database;

in response to switching the first tenant database, moving the first tenant database from the first logical cluster to a second logical cluster for execution of an operation relative to a second availability zone;

executing, for the second execution group, an update procedure to provide a third shared database; and switching each tenant database in the second execution group to read from the third shared database.

2. The method of claim 1, wherein tenant databases in the set of tenant databases comprise different types of tenant databases.

3. The method of claim 1, further comprising defining, within the set of tenant databases, a set of logical clusters comprising the first logical cluster and the second logical cluster, tenant databases in a logical cluster reading from a same shared database, each logical cluster enabling reconfiguration in event of occurrence of a failover.

4. The method of claim 1, wherein, prior to the update procedure, a third tenant database in the first execution group accesses a third shared database.

5. The method of claim 1, wherein each shared database is mirrored in the first availability zone and the second availability zone.

6. The method of claim 1, wherein the cloud platform is provisioned in Kubernetes and each resource unit comprises a pod.

7. A non-transitory computer-readable storage medium coupled to one or more processors and having instructions stored thereon which, when executed by the one or more processors, cause the one or more processors to perform operations for migration of one or more of objects and one or more workloads from a source database system to a target database system, the operations comprising:

providing a set of tenant databases within a cloud platform, the set of tenant databases comprising a first tenant database and a second tenant database in a first availability zone;

providing a set of shared databases within the cloud platform, the set of shared databases comprising a first shared database in the first availability zone, the first shared database being a source version and being accessed by the first tenant database and the second tenant database in the first availability zone;

defining, within the set of tenant databases, one or more execution groups, a first execution group comprising the first tenant database and a second execution group comprising the second tenant database, the first tenant database and the second tenant database both being assigned to a first logical cluster;

executing, for the first execution group, an update procedure to provide a second shared database in a target version that is updated relative to the source version;

switching the first tenant database in the first execution group to read from the second shared database, and after the update procedure, the second tenant database still accessing the first shared database;

in response to switching the first tenant database, moving the first tenant database from the first logical cluster to a second logical cluster for execution of an operation relative to a second availability zone;

executing, for the second execution group, an update procedure to provide a third shared database; and switching each tenant database in the second execution group to read from the third shared database.

8. The non-transitory computer-readable storage medium of claim 7, wherein tenant databases in the set of tenant databases comprise different types of tenant databases.

9. The non-transitory computer-readable storage medium of claim 7, wherein operations further comprise defining, within the set of tenant databases, a set of logical clusters comprising the first logical cluster and the second logical cluster, tenant databases in a logical cluster reading from a same shared database, each logical cluster enabling reconfiguration in event of occurrence of a failover.

10. The non-transitory computer-readable storage medium of claim 7, wherein, prior to the update procedure, a third tenant database in the first execution group accesses a third shared database.

11. The non-transitory computer-readable storage medium of claim 7, wherein each shared database is mirrored in the first availability zone and the second availability zone.

12. The non-transitory computer-readable storage medium of claim 7, wherein the cloud platform is provisioned in Kubernetes and each resource unit comprises a pod.

13. A system, comprising:

a computing device; and a computer-readable storage device coupled to the computing device and having instructions stored thereon which, when executed by the computing device, cause the computing device to perform operations for migration of one or more of objects and one or more workloads from a source database system to a target database system, the operations comprising:

providing a set of tenant databases within a cloud platform, the set of tenant databases comprising a first tenant database and a second tenant database in a first availability zone;

providing a set of shared databases within the cloud platform, the set of shared databases comprising a first shared database in the first availability zone, the first shared database being a source version and being accessed by the first tenant database and the second tenant database in the first availability zone;

defining, within the set of tenant databases, one or more execution groups, a first execution group comprising the first tenant database and a second execution group comprising the second tenant database, the first tenant database and the second tenant database both being assigned to a first logical cluster;

executing, for the first execution group, an update procedure to provide a second shared database in a target version that is updated relative to the source version;

switching the first tenant database in the first execution group to read from the second shared database, and after the update procedure, the second tenant database still accessing the first shared database;

in response to switching the first tenant database, moving the first tenant database from the first logical cluster to a second logical cluster for execution of an operation relative to a second availability zone;

executing, for the second execution group, an update procedure to provide a third shared database; and switching each tenant database in the second execution group to read from the third shared database.

14. The system of claim 13, wherein tenant databases in the set of tenant databases comprise different types of tenant databases.

15. The system of claim 13, wherein operations further comprise defining, within the set of tenant databases, a set of logical clusters comprising the first logical cluster and the second logical cluster, tenant databases in a logical cluster reading from a same shared database, each logical cluster enabling reconfiguration in event of occurrence of a failover.

16. The system of claim 13, wherein, prior to the update procedure, a third tenant database in the first execution group accesses a third shared database.

17. The system of claim 13, wherein each shared database is mirrored in the first availability zone and the second availability zone.

* * * * *